Inventor
Walter Ramberg
By Raeph L Chappell
Attorney

Patented May 23, 1950

2,508,419

UNITED STATES PATENT OFFICE 2,508,419

STRAIN DETECTOR

Walter Ramberg, Chevy Chase, Md.

Application September 25, 1945, Serial No. 618,595

3 Claims. (Cl. 33—143)

(Granted under the act of March 3, 1883, as amended April 30, 1928; 370 O. G. 757)

My invention relates generally to apparatus for detecting strain displacements, and more particularly to the pick-up component thereof.

A shortcoming of the presently available pick-up devices is that such devices have an insufficient voltage output corresponding to a given small strain displacement, to operate simple indicating circuits. My invention has the advantage of producing exceptionally large voltage variations for given small strain displacements. The output is ample to operate high frequency recording galvanometers directly without the complication of carrier frequency oscillators and amplifiers. The change in measured voltage obtained is of the order of 0.6 volt per 0.001 inch.

The principal object of my invention is to provide an apparatus which provides exceptionally large voltage variations as the result of very small strain displacements.

Another object of my invention is to provide an apparatus for detecting strain displacements embodying an elastic conducting strip longitudinally associated with an energized resistance coil, and adapted to change the extent of its bearing contact on said coil by a change of the configuration of said elastic strip.

For a more complete understanding of the invention and for other objects and advantages thereof, reference should now be had to the following description in connection with the accompanying drawings in which Fig. 1 is a half-sectional view of my invention for detecting displacements caused by strain, connected into a Wheatstone bridge circuit;

Figure 1:
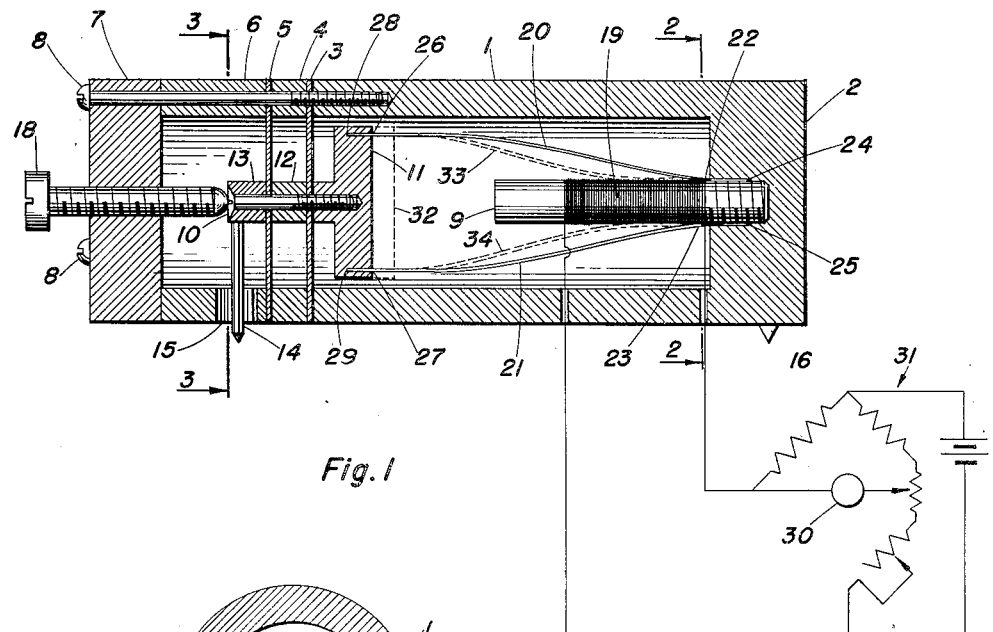
Figure 2:
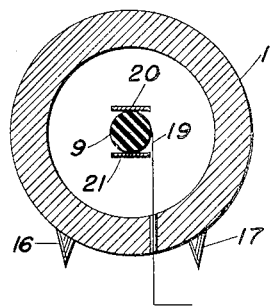
Fig. 2 is a cross-sectional view of Fig. 1 taken along line 2—2.
Figure 3:
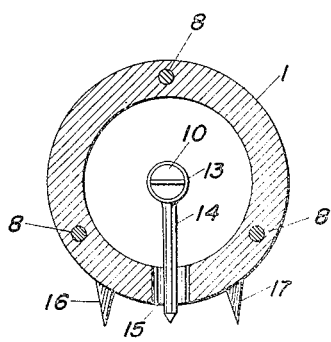
Fig. 3 is a cross-sectional view of Fig. 1 taken along line 3—3.

Reference numeral 1 indicates a tubular housing closed at one end 2. The other end is provided with disc flexure plate 3, housing extension section 4, disc flexure plate 5, housing extension section 6, and cover plate 7, successively related and secured to said housing by three equally spaced assembly screws 8. Centrally of said housing end 2 is a coaxially positioned non-conducting cylindrical element 9 secured thereto by threaded engagement.

Said discs are centrally apertured to receive assembly screw 10 which secures T-shaped thrust element 11, leg extension 12 and leg extension 13 in assembled relationship to said interposed discs. Elongated gage point 14, cast integrally and radially with leg extension 13, is directed downwardly and projects through opening 15 provided in housing extension section 6. Companion gage points 16 and 17, provided on the opposite end 2 of the housing, are arranged to provide a three-point support therefor in conjunction with gage point 14. Position screw 18 is threaded through the center of cover plate 7 for abutting engagement with the head of assembly screw 10. This position screw provides means for initially positioning the assembled thrust element 11 and its attached gage point 14 when necessary.

A fine wire resistance 19 is tightly coiled around cylinder 9, and is connected into Wheatstone bridge 31 as one arm thereof. Each individual turn of said wire is insulated from its companion turns. Conducting leaf springs 20 and 21, longitudinally positioned relative to resistance coil 19, have their corresponding ends 22 and 23 tangentially and fixedly bearing in contact with the remote end of coil 19. Said fixation is provided by sliding said ends into horizontal slots 24 and 25, respectively, and peening said ends securely in said slots. The other ends 26 and 27 of said leaf springs 20 and 21, respectively, are widely separated and engaged to T-shaped element 11, equal distances from its center. Said engagement is provided by sliding said ends into horizontal slots 28 and 29, respectively, and peening them into securement when the proper configuration is provided to said leaf springs. Said springs 20 and 21 are angularly displaced 180° from each other. Leaf spring 21 is provided with an insulating surface so as to insulate it from coil 19; leaf spring 20 is provided with a metallic surface that has a small contact resistance at low contact pressures thereby making excellent contact with coil 19.

Said springs are given an identical configuration such that they will give an approximately linear relationship between the strain to be measured and the current or voltage in the indicator or recorder 30 across the Wheatstone bridge 31. The separation of the ends 26 and 27 is selected to give the required sensitivity. The springs 20 and 21 are designed so as to provide a sufficiently small force resisting displacement. The initial configuration and the width of the springs are proportioned to give an approximate linear relation between current or voltage and the strain to be measured.

In operation for compressional strain measurements, the position screw 18 is backed off the head of screw 10, and then driven ahead into contact with the head of screw 10 until a light initial strain is provided, thereby taking up any lost motion in the pick-up and preparing the pick-up for an initial reading. The instrument is placed with its gage points in contact with a structure to be strained and securely clamped thereto. The component of strain parallel to the axis of the pick-up will cause a displacement of T-shaped element 11 to the position shown by dotted line 32, resulting in a change of the configuration of leaf springs 20 and 21 to a configuration shown by dotted lines 33 and 34, respectively. Gage point 14 moves relative to housing 1 in the opening 15 provided in housing extension section 6. Upon release of the straining force, the structure under strain and the associated pick-up elements will retract to their original position. The movement of the T-shaped element 11 is guided in an axial direction by flexure discs 3 and 5. As the deflection curve of springs 20 and 21 changes, responsive to strain, the extent of their bearing contact on coil 19 increases. Thus progressively more and more turns are shorted out of the bridge circuit, and the bridge is correspondingly unbalanced. Hence, any departure from a pre-determined and initial reading or reference point of the milliammeter 30 serves to detect a displacement. By suitable calibration, the indicating means 30 can be made to indicate strain directly.

In operation for tensional strain measurements, the position screw 18 is driven ahead until T-shaped element 11 reaches the position of dotted lines 32, resulting in a change of the configuration of leaf springs 20 and 21 to a configuration shown by dotted lines 33 and 34, respectively. This establishes an initial position for an initial reading. The pick-up is placed with its gage points in contact with a structure to be strained and securely clamped thereto. The positioning screw is then backed off a distance that will allow adequate clearance for the operational displacement of T-shaped element 11. As the structure is tensionally strained, the component of strain parallel to the pick-up causes a retractive displacement of the T-shaped element 11, resulting in a change of the configuration of the leaf springs from dotted position 33 and 34 to position 20 and 19, respectively. As the configuration curve changes, responsive to strain, it decreases the extent of its bearing contact with coil 19. Thus progressively more and more coil windings are "cut in" to the bridge circuit, and the bridge is correspondingly unbalanced. Hence, any departure from a pre-determined and initial reading or reference point of the milliammeter 30 serves to detect a displacement. By suitable calibration, the milliammeter or indicating means 30 is made to indicate strain directly.

While I have shown a particular embodiment of my invention, it will be understood, of course, that I do not wish to be limited thereto, since many modifications may be made, and I, therefore, contemplate by the appended claims to cover any such modifications as fall within the true spirit and scope of my invention.

The invention described herein may be manufactured and used by or for the Government of the United States of America for governmental purposes without the payment of any royalties thereon or therefor.

What is claimed is:

1. A strain detecting pick-up, comprising: a housing having a hole through its side; gage point means mounted externally on said housing and related longitudinally of said hole; supporting means mounted within said housing; a resistance coil wound around said supporting means and adapted to be connected into a Wheatstone bridge as one arm thereof; a thrust member flexibly mounted in said housing and adapted to be displaced axially of said coil; gage point means mounted on said thrust member and extending through said hole; a positioning screw threaded through said housing for engagement with said thrust member; and elastic conducting means having one end secured to said thrust member and the other end secured to the housing adjacent said coil so as to flexibly bear against said coil, said elastic means being shaped to deflectably change the extent of its bearing contact along said resistance coil in a substantially linear relation with respect to the displacement of said gage point on said thrust member.

2. A strain detecting pick-up, comprising: a housing; supporting means mounted in said housing; a resistance coil wound around said supporting means; a thrust member mounted in said housing for displacement axially of said coil; means mounted on said member and extending through said housing for communicating the thrust to be measured to said member; elastic conducting means having one end secured to said member and the other end secured to said housing adjacent said coil so as to flexibly bear against said coil, said elastic means being shaped to deflectably change the extent of its bearing contact along said coil upon displacement of said thrust member axially of said coil; and means connected across said coil for measuring the effective resistance thereof.

3. A strain detecting pick-up, comprising: a support; an elongated resistance element mounted on said support; elastic conducting means having one end fixed to said support adjacent one end of said element and an intermediate portion thereof bearing against said element to alter the effective resistance thereof; a thrust member secured to the other end of said conducting means and mounted on said support for displacement longitudinally of said element, movement of said member deflecting said conducting means to vary the extent of its bearing against said element; gage point means mounted on said thrust member; gage point means mounted on said support and spaced from the first-mentioned gage means; and means connected across said element for measuring the effective resistance thereof.

WALTER RAMBERG.

REFERENCES CITED

The following references are of record in the file of this patent:

UNITED STATES PATENTS

| Number | Name | Date |
| --- | --- | --- |
| 2,178,422 | Heagney | Oct. 31, 1939 |
| 2,210,970 | Bonell | Aug. 13, 1940 |
| 2,381,990 | Stevens | Aug. 14, 1945 |

FOREIGN PATENTS

| Number | Country | Date |
| --- | --- | --- |
| 452,042 | Germany | Nov. 5, 1927 |